United States Patent
Koga et al.

(10) Patent No.: US 9,592,617 B2
(45) Date of Patent: Mar. 14, 2017

(54) METHOD FOR MACHINING SEAL-MOUNTING GROOVE IN METAL PLATE

(71) Applicant: NOK CORPORATION, Tokyo (JP)

(72) Inventors: Shotaro Koga, Fujisawa (JP); Masaki Sato, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/437,991

(22) PCT Filed: Oct. 7, 2013

(86) PCT No.: PCT/JP2013/077201
§ 371 (c)(1),
(2) Date: Apr. 23, 2015

(87) PCT Pub. No.: WO2014/069171
PCT Pub. Date: May 8, 2014

(65) Prior Publication Data
US 2015/0290824 A1   Oct. 15, 2015

(30) Foreign Application Priority Data
Oct. 30, 2012 (JP) ................. 2012-238981

(51) Int. Cl.
*B21D 17/02* (2006.01)
*B26D 3/06* (2006.01)
(Continued)

(52) U.S. Cl.
CPC ............. *B26D 3/065* (2013.01); *B21D 17/02* (2013.01); *B21K 23/00* (2013.01); *B21D 28/02* (2013.01);
(Continued)

(58) Field of Classification Search
CPC . B21J 5/00; B21D 17/02; B21D 22/04; B21D 31/02; B21D 22/02; B21D 28/02; B21D 28/246; B26D 3/065; B26D 3/085
See application file for complete search history.

(56) References Cited

U.S. PATENT DOCUMENTS 2,013,333 A  *  9/1935  Anderson ............. B21D 17/02
                                                    277/576
3,866,456 A  *  2/1975  Shepard ................. D04H 18/00
                                                     30/168
(Continued)

FOREIGN PATENT DOCUMENTS

DE         19755104 A1    6/1999
JP         S57-47531 A    3/1982
(Continued)

OTHER PUBLICATIONS

Extended European Search Report for Application No. EP13851419.5 dated Feb. 4, 2016 (6 pages).

*Primary Examiner* — Edward Tolan
(74) *Attorney, Agent, or Firm* — Harness, Dickey & Pierce, P.L.C.

(57) ABSTRACT

The invention provides a processing method of a seal mounting groove in a metal plate, which can form the seal mounting groove with a small pressing pressure, whereby it is possible to respond to request for easily manufacturing and achieving a low cost, and can achieve a problem caused by a protruding phenomenon of a metal which plastically deforms going with formation of the seal mounting groove. In order to achieve the object, in a method of pressing a seal mounting groove by using a punch on a plane of a metal plate, a leading end portion of the punch is formed into an inclined surface shape which is inclined in a punch width direction, and the seal mounting groove which inclines in a groove width direction in its groove bottom portion and is formed into an inclined surface shape is formed by pressing while using the punch.

1 Claim, 5 Drawing Sheets

(51) Int. Cl.
  *B21K 23/00* (2006.01)
  *B26D 3/08* (2006.01)
  *B21D 28/02* (2006.01)
  *H01M 8/02* (2016.01)

(52) U.S. Cl.
  CPC .......... *B26D 3/085* (2013.01); *H01M 8/0271* (2013.01); *Y02P 70/56* (2015.11)

(56) References Cited

U.S. PATENT DOCUMENTS

| | | | | |
|---|---|---|---|---|
| 4,300,381 | A * | 11/1981 | Sugiuchi | B21K 3/00 219/69.12 |
| 4,558,585 | A * | 12/1985 | Berry, Jr. | G01N 29/30 72/324 |
| 6,122,814 | A | 9/2000 | Pennig et al. | |
| 7,269,989 | B2 * | 9/2007 | Joseph | B21J 5/00 29/890.142 |
| 8,986,902 | B2 | 3/2015 | Urakawa | |
| 2005/0188736 | A1 * | 9/2005 | Akahane | B21J 5/00 72/325 |
| 2011/0104583 | A1 | 5/2011 | Urakawa | |
| 2013/0167704 | A1 * | 7/2013 | Swinford | B21J 5/12 83/862 |

FOREIGN PATENT DOCUMENTS

| | | |
|---|---|---|
| JP | H07-32059 A | 2/1995 |
| JP | H10-256431 A | 9/1998 |
| JP | 2001-210283 A | 8/2001 |
| JP | 2009-277511 A | 11/2009 |
| JP | 2011-096545 A | 5/2011 |

* cited by examiner

METHOD FOR MACHINING SEAL-MOUNTING GROOVE IN METAL PLATE

CROSS-REFERENCE TO RELATED APPLICATIONS

This application is a 371 U.S. National Stage Application of International Application No. PCT/JP2013/077201, filed on Oct. 7, 2013, and published in Japanese as WO 2014/069171 A1 on May 8, 2014. This application claims priority to Japanese Application No. 2012-238981, filed on Oct. 30, 2012. The entire disclosures of the above applications are incorporated herein by reference.

BACKGROUND OF THE INVENTION

Field of the Invention

The present invention relates to a processing method of a seal mounting groove in a metal plate, that is, a method for processing a seal mounting groove on a plane of a metal plate. The metal plate is, for example, used as a separator which is a cell component part of a fuel battery.

Description of the Conventional Art

For future diffusion of the fuel battery, it is necessary to downsize the cell component parts such as the separator and the gasket, make them be easily manufactured and make costs thereof low. In order to respond these demands, for example, a separator integrated seal is hopeful, the separator integrated seal being obtained by integrally molding a gasket constructed by a rubber-like elastic body directly in a separator constructed by a metal plate. However, employment of the separator integrated seal mentioned above is on condition that it is necessary to make study of easily manufacturing the separator itself and achieving a low cost.

Figure 4:
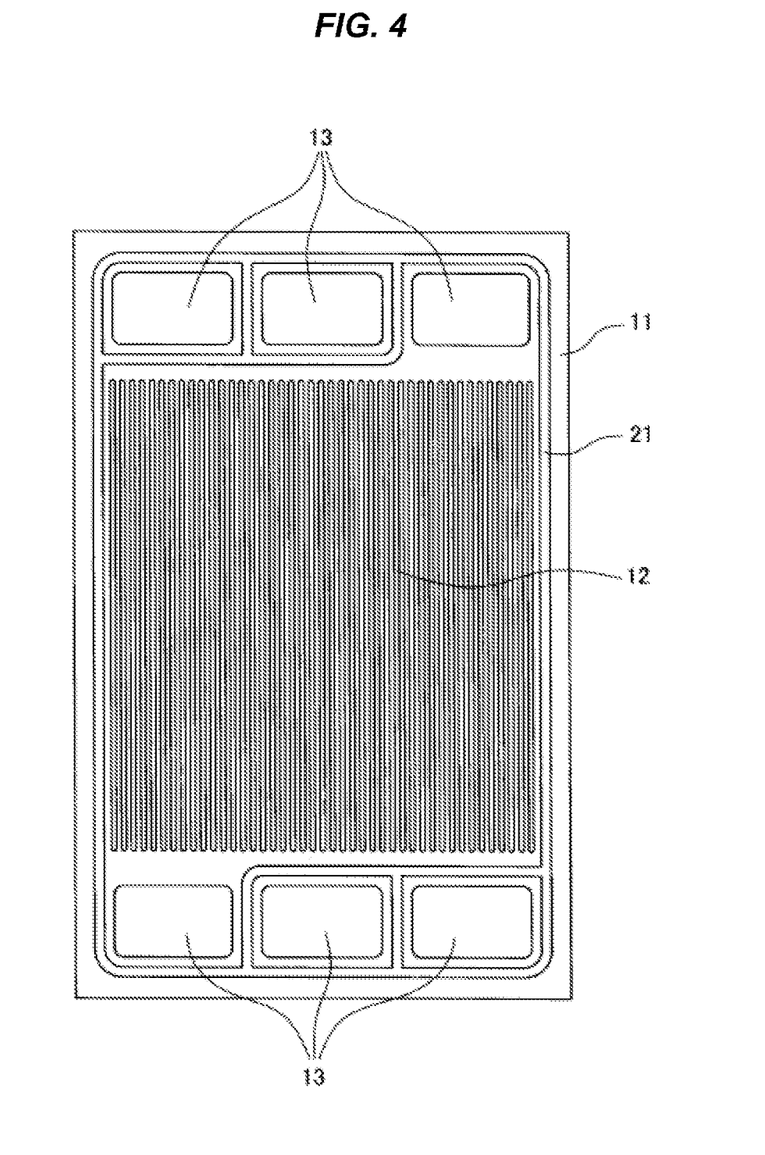
FIG. 4 is a plan view of a separator for a fuel battery as an example of a metal plate and a gasket provided in the separator.

FIG. 4 shows an example of a separator 11 which is constructed by a metal plate, and a gasket 21 is integrally formed on a plane of the separator 11 so as to surround a periphery of a power generation area 12 and so as to surround a periphery of each of manifold holes 13 (refer to Japanese Unexamined Patent Publication No. 2011-96545).

Figure 5:
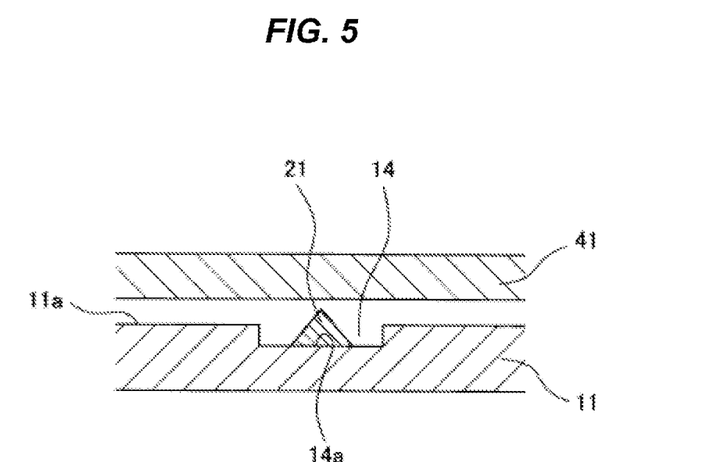
FIG. 5 is a cross sectional view of the separator, the gasket and a laminated part.

Further, as shown in FIG. 5, a seal mounting groove 14 for mounting a gasket 21 is formed on the plane of the separator 11 in conformity to arrangement of the gasket 21, and the gasket 21 is generally formed integrally in a groove bottom portion 14a of the seal mounting groove 14.

A cutting method is provided as a method of forming the seal mounting groove 14 on the plane of the separator 11 which is constructed by the metal plate.

However, the cutting method has a good processing precision, however, has a problem that the processing cost is high.

Figure 6A:
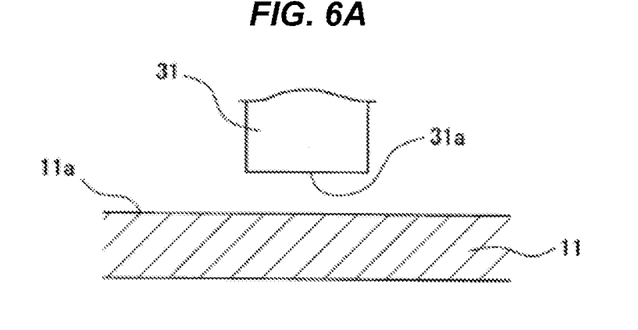
FIG. 6 is a view explaining steps of a processing method according to a prior art.
Figure 6B:
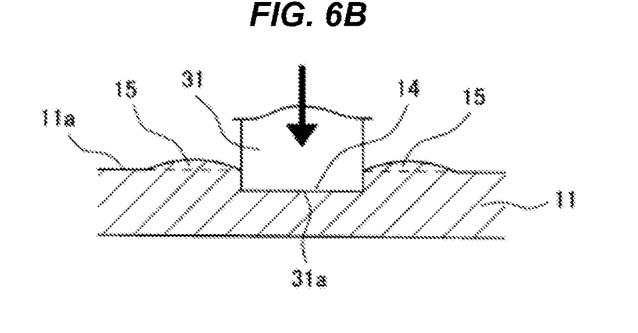
Figure 6C:
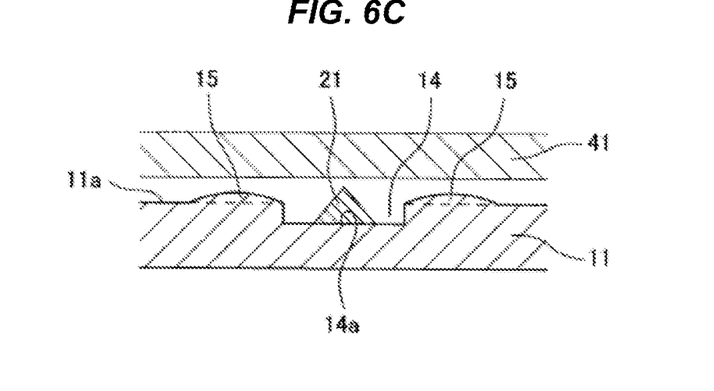

Further, a pressing method is provided as a method of forming the seal mounting groove 14 on the plane of the separator 11 which is constructed by the metal plate, and the pressing method forms the seal mounting groove 14 on the plane of the separator 11 on the basis of a strong pressure by a punch 31, as shown in FIGS. 6A to 6C. The punch 31 is frequently provided as a part of a press mold.

However, since a leading end portion 31a of the punch 31 is conventionally formed into a flat shape which is in parallel to the surface 11a of the separator 11 as shown, the pressing pressure is dispersed. As a result, the seal mounting groove 14 having a predetermined depth can be formed only by applying an extremely great pressing pressure.

Further, since the metal which plastically deforms going with the formation of the seal mounting groove 14 protrudes in shoulder portions in both right and left sides of the seal mounting groove 14 (the protruding portion is shown by reference numeral 15), there is a risk that a plane area of the power generation area 12 which can normally function becomes narrower due to the protruding phenomenon. Further, in the case of carrying out a drawing process for crushing and flattening the protruding portion 15, the protruding portions 15 in both the right and left sides can be crushed and flattened only by applying the great pressing pressure.

SUMMARY OF THE INVENTION

Problem to be Solved by the Invention

The present invention is made by taking the above points into consideration, and an object of the present invention is to provide a processing method of a seal mounting groove in a metal plate, which can form the seal mounting groove with a small pressing pressure, whereby it is possible to respond to request for easily manufacturing and achieving a low cost, and can achieve a problem caused by a protruding phenomenon of a metal which plastically deforms going with formation of the seal mounting groove.

Means for Solving the Problem

In order to achieve the object, a processing method according to a first aspect of the present invention is a method of pressing a seal mounting groove by using a punch on a plane of a metal plate, wherein a leading end portion of the punch is formed into an inclined surface shape which is inclined in a punch width direction, and the seal mounting groove which inclines in a groove width direction in its groove bottom portion and is formed into an inclined surface shape is formed by pressing while using the punch.

Further, a processing method according to a second aspect of the present invention is the processing method described in the first aspect mentioned above, wherein a cross sectional shape of the seal mounting groove is formed into a triangular cross sectional shape or an approximately triangular cross sectional shape which is provided with three sides constructed by an inclined surface shaped groove bottom portion, a groove side surface portion and a groove opening portion.

Further, a processing method according to a third aspect of the present invention is the processing method described in the second aspect mentioned above, wherein the triangular shape satisfies a relationship L1>L3>L2, in which L1 is a length of the inclined surface shaped groove bottom portion, L2 is a length of the groove side surface portion, and L3 is a length of the groove opening portion.

In the processing method of the present invention having the structure mentioned above, since the leading end portion of the punch is formed into the inclined surface shape which inclines in the punch width direction, the pressing process is started in advance in one end portion in the groove width direction of the seal mounting groove by using the punch, and an eating width at which the punch eats into the metal plate is expanded little by little according to the progress of the processing. Therefore, since the pressing pressure is concentrated partly, the seal mounting groove can be formed with the pressing pressure which is comparatively smaller than the conventional one.

Further, in the case that the pressing process is carried out by using the punch which is formed into the inclined surface shape in its leading end portion, the metal plastically deforming going with the formation of the seal mounting groove protrudes only in the right or left one shoulder portion (the one where the punch leading end inclined surface goes backward) in place of both the right and left shoulder portions of the seal mounting groove. Therefore, it is possible to inhibit the plane area of the power generation area which can function normally from becoming narrower, by making the shoulder portion where the protruding phenomenon is not generated be included, for example, in the power generation area in the separator for the fuel battery. Further, since the drawing process is applied only to the one protruding portion in the case of carrying out the drawing process for crushing and flattening the protruding portion, it is possible to crush and flatten the protruding portion with the smaller pressing pressure than the conventional one.

In the case that the pressing process is carried out by using the punch which is formed into the inclined surface shape in its leading end portion as described above, the seal mounting groove formed thereby is formed into the inclined surface shape which is inclined in its groove bottom portion in the groove width direction. As a result, for example, the gasket for the fuel battery is integrally formed in the inclined surface shaped groove bottom portion.

As the cross sectional shape of the seal mounting groove having the inclined surface shaped groove bottom portion, the following aspects can be thought.

(1) A quadrangular cross sectional shape or an approximately quadrangular cross sectional shape having four sides which are constructed by an inclined surface shaped groove bottom portion, a groove side surface portion having a deeper groove width, a groove side surface portion having a shallower groove depth and a groove opening portion.

(2) A triangular cross sectional shape or an approximately triangular cross sectional shape having three sides which are constructed by an inclined surface shaped groove bottom portion, a groove side surface portion and a groove opening portion.

The present invention includes both of the above items (1) and (2). However, in the case of (2), since the groove side surface portion is formed only in one in the groove width direction and is not formed in the other, the pressing process is finished in the other end portion without the punch eating into the metal plate. Therefore, since the eating amount of the punch into the metal plate is smaller according to the case (2) in comparison with the case (1), there is an advantage that the pressing process is finished for a short time.

Since the inclined surface shaped groove bottom portion acts as the pressing surface compressing the gasket at the stack assembling time, an angle of incline thereof is preferably as small as possible. Therefore, from this point of view, the triangular shape preferably satisfies the relationship $L1>L3>L2$, in which $L1$ is the length of the inclined surface shaped groove bottom portion, $L2$ is the length of the groove side surface portion, and $L3$ is the length of the groove opening portion.

Effect of the Invention

The present invention achieves the following effects.

More specifically, in the present invention, since the leading end portion of the punch is formed into the inclined surface shape which inclines in the punch width direction, as described above, the pressing process is started in advance in one end portion in the groove width direction of the seal mounting groove, and an eating width at which the punch eats into the metal plate is expanded little by little according to the progress of the processing. Therefore, since the pressing pressure is concentrated partly, the seal mounting groove can be formed with the pressing pressure which is comparatively smaller than the conventional one.

Further, in the case that the pressing process is carried out by using the punch which is formed into the inclined surface shape in its leading end portion, the metal plastically deforming going with the formation of the seal mounting groove protrudes only in the one shoulder portion of the seal mounting groove, by carrying out the pressing process with using the punch which is formed into the inclined surface shape in its leading end portion. Therefore, it is possible to inhibit the area of the power generation area which functions normally from becoming narrower, by making the shoulder portion where the protruding phenomenon is not generated be included, for example, in the power generation area in the separator for the fuel battery. Further, since the drawing process is applied only to the one protruding portion in the case of carrying out the drawing process for crushing and flattening the protruding portion, it is possible to crush and flatten the protruding portion with the smaller pressing pressure than the conventional one.

Therefore, according to the desired object of the present invention, it is possible to provide the processing method of the seal mounting groove in the metal plate, which can form the seal mounting groove with the small pressing pressure, whereby it is possible to respond to request for easily manufacturing and achieving the low cost, and can achieve the problem caused by the protruding phenomenon of the metal which plastically deforms going with formation of the seal mounting groove, on the basis of the above matters.

Further, it is possible to shorten the pressing process time by forming the cross sectional shape of the seal mounting groove into the triangular cross sectional shape or the approximately triangular cross sectional shape having three sides which are constructed by the inclined surface shaped groove bottom portion, the groove side surface portion and the groove opening portion, and since the length of each of the sides of the triangular shape satisfies the relationship $L1>L3>L2$ mentioned above, it is possible to sufficiently compress the gasket even in the case that the groove bottom portion is formed into the inclined surface shape.

DETAILED DESCRIPTION OF PREFERRED EMBODIMENTS

Next, a description will be given of embodiments according to the present invention with reference to the accompanying drawings.

Figure 1A:
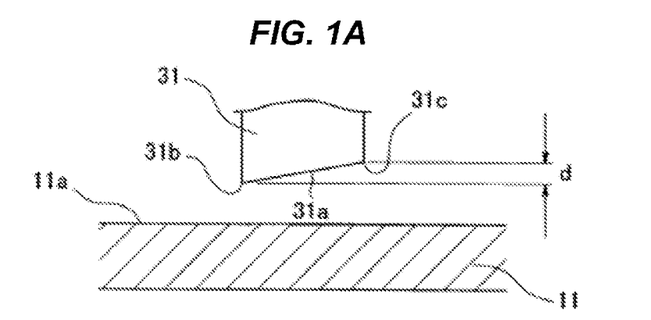
FIG. 1 is a view explaining steps of a processing method according to an embodiment of the present invention.
Figure 1B:
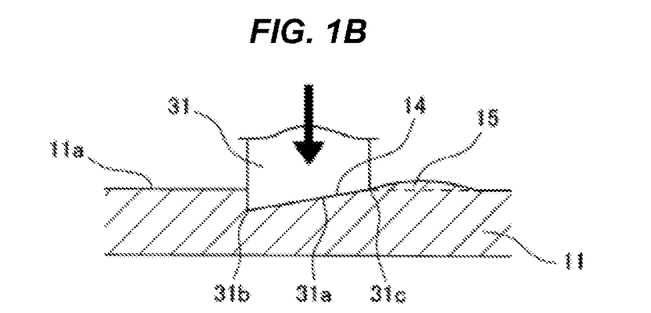
Figure 1C:
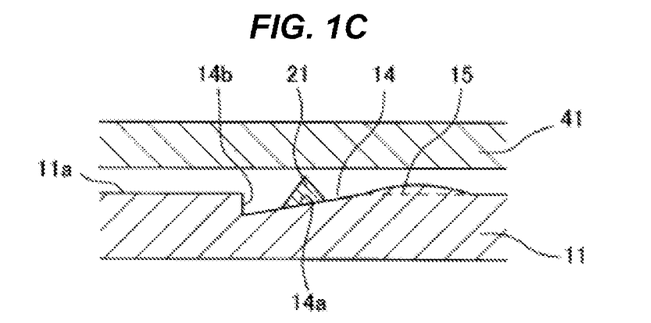

A processing method of a seal mounting groove according to the embodiment is a method for pressing a seal mounting groove 14 on a plane of a separator 11 for a fuel battery corresponding to a metal plate by using a punch 31, as shown in FIG. 1. As shown in FIG. 1A, an inclined surface shaped seal mounting groove 14 in which a groove bottom portion 14a is inclined in a groove width direction is formed as shown in FIG. 1C by preparing a punch 31 which is formed its leading end portion 31a into an inclined surface shape inclining in a punch width direction, as the punch 31, and pressing while using the punch 31 as shown in FIG. 1B. As post steps, a gasket 21 constructed by a rubber-like elastic body is integrally formed in the groove bottom portion 14a, and the gasket 21 is pinched and compressed between the groove bottom portion 14a and a laminated part 41 at the stack assembling time.

A leading end portion 31a of the punch 31 is formed into an inclined surface shape which is linear over a whole width in a punch width direction. One end portion in the leading end portion 31a is set to an acute angle shaped forward corner portion (an acute corner portion) 31b, and the other end portion is set to an obtuse angle shaped rearward corner portion (an obtuse corner portion) 31c. An amount of displacement in a pressing direction between the acute angle shaped forward corner portion 31b and the obtuse angle shaped rearward corner portion 31c is expressed by d on the drawing, and the pressing process by the punch 31 is carried out over the displacement amount d. Therefore, the pressing process is finished at the same time when the obtuse angle shaped rearward corner portion 31c reaches a surface 11a of the separator 11. In other words, the pressing process is set to be finished just before a press resistance of the separator 11 to the punch 31 reaches the maximum value.

Further, in the case that the pressing process is carried out by using the punch 31 which is formed its leading end portion 31a into the inclined surface shape as mentioned above, the metal plastically deforming going with the formation of the seal mounting groove 14 protrudes only in a shoulder portion in a shallower groove side of the seal mounting groove 14 (close to the obtuse angle shaped rearward corner portion 31c in the punch leading end portion 31a) (the protruding portion is shown by reference numeral 15).

Figure 2:
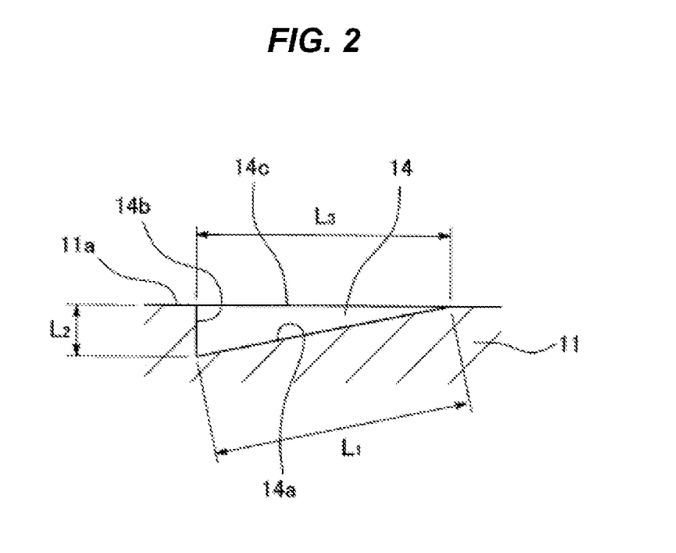
FIG. 2 is a cross sectional view of a seal mounting groove which is formed by the processing method.

Further, the seal mounting groove 14 formed by the method is formed its cross sectional shape into a triangular cross sectional shape or an approximately triangular cross sectional shape having three sides which are constructed by an inclined surface shaped groove bottom portion 14a, a groove side surface portion 14b and a groove opening portion 14c, as is shown in FIG. 2 in an enlarged manner. The triangular shape is set to a right angled triangle since the groove side surface portion 14b is vertical to the surface 11a of the separator 11. Further, the triangular shape is set to satisfy a relationship L1>L3>L2 (expression e) in which L1 is a length of the inclined surface shaped groove bottom portion 14a, L2 is a length (a groove depth) of the groove side surface portion 14a, and L3 is a length (a groove width) of the groove opening portion. L2 corresponds to the above d.

In the processing method having the structure mentioned above, since the leading end portion 31a of the punch 31 is formed into the inclined surface shape which is inclined in the punch width direction, the pressing process is started in advance in one end portion in the groove width direction of the seal mounting groove 14, and an eating width at which the punch 31 eats into the separator 11 is expanded little by little according to the progress of the processing. Therefore, since the pressing pressure is concentrated partly, the seal mounting groove 14 can be formed with the pressing pressure which is comparatively smaller than the conventional one.

Further, since the pressing process is carried out by using the punch 31 which is formed into the inclined surface shape in its leading end portion 31a, the metal plastically deforming going with the formation of the seal mounting groove 14 protrudes only in the shoulder portion close to the shallow groove side of the seal mounting groove 14. Therefore, it is possible to inhibit the plane area of the power generation area which can function normally from becoming narrower, by making the shoulder portion where the protruding phenomenon is not generated be included in the power generation area in the separator 11. Further, since the drawing process is applied only to the one protruding portion 15 in the case of carrying out the drawing process for crushing and flattening the protruding portion 15, it is possible to crush and flatten the protruding portion 15 with the smaller pressing pressure than the conventional one.

Further, it is possible to shorten the pressing process time by forming the cross sectional shape of the seal mounting groove 14 into the triangular cross sectional shape or the approximately triangular cross sectional shape having three sides which are constructed by the inclined surface shaped groove bottom portion 14a, the groove side surface portion 14b and the groove opening portion 14c. Further, since the length of each of the sides of the triangular shape satisfies the relationship of the expression (e) mentioned above, it is possible to sufficiently compress the gasket 21 even in the case that the groove bottom portion 14a is formed into the inclined surface shape.

Figure 3:
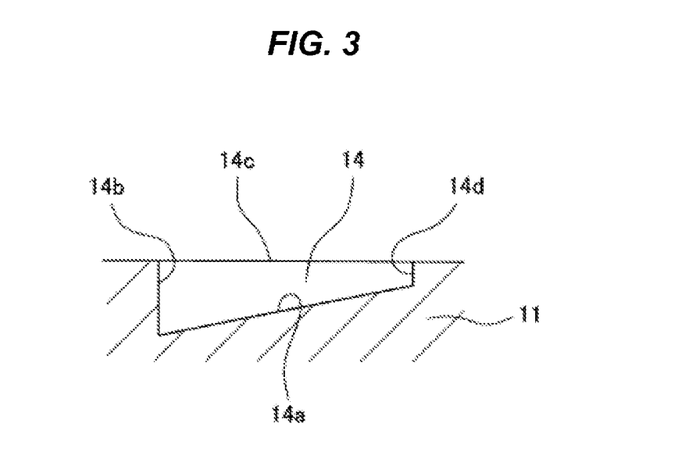
FIG. 3 is a cross sectional view showing the other embodiment of the seal mounting groove.

As described above, the cross sectional shape of the seal mounting groove 14 may be formed, for example, into a quadrangular cross sectional shape or an approximately quadrangular cross sectional shape having four sides which are constructed by an inclined surface shaped groove bottom portion 14a, a groove side surface portion 14b having a deeper groove depth, a groove side surface portion 14d having a shallower groove depth and a groove opening portion 14c, as shown in FIG. 3. In this case, the groove depth becomes deeper in comparison with FIG. 2, however, it is possible to increase a volumetric capacity of the seal mounting groove 14. Further, in FIG. 1C, the gasket 21 is formed into the triangular cross sectional shape, however, the cross sectional shape of the gasket 21 is not particularly limited in the present invention, for example, may be formed into a chevron cross sectional shape. Further, the gasket 21 may be integrally formed in the groove bottom portion 14a of the seal mounting groove 14, and may be bonded to the groove bottom portion 14a after being independently formed.

What is claimed is:

1. A processing method of a seal mounting groove, the method comprising:
pressing the seal mounting groove by using a punch on a plane of a metal plate; and
mounting a seal in the seal mounting groove,
wherein a leading end portion of the punch is formed into an inclined surface shape which is inclined in a punch width direction, the leading end portion of the punch including an acutely angled portion and an obliquely angled portion,
the seal mounting groove inclines in a groove width direction in its groove bottom portion and is formed by pressing the punch against the metal plate, and during the pressing of the punch against the metal plate a protruding portion in the metal plate is formed proximate the obliquely angled portion, a cross-sectional shape of the seal mounting groove is formed into a triangular cross sectional shape or an approximately triangular cross sectional shape which is provided with three sides constructed by an inclined surface shaped groove bottom portion, a groove side surface portion, and a groove opening portion, and the triangular shape satisfies a relationship $L1>L3>L2$, in which $L1$ is a length of the inclined surface shaped groove bottom portion, $L2$ is a length of the groove side surface portion, and $L3$ is a length of the groove opening portion.

\* \* \* \* \*